Dec. 21, 1948.  W. PENN-GASKELL HALL  2,457,040
BORING HEAD
Filed Jan. 10, 1945  3 Sheets—Sheet 1
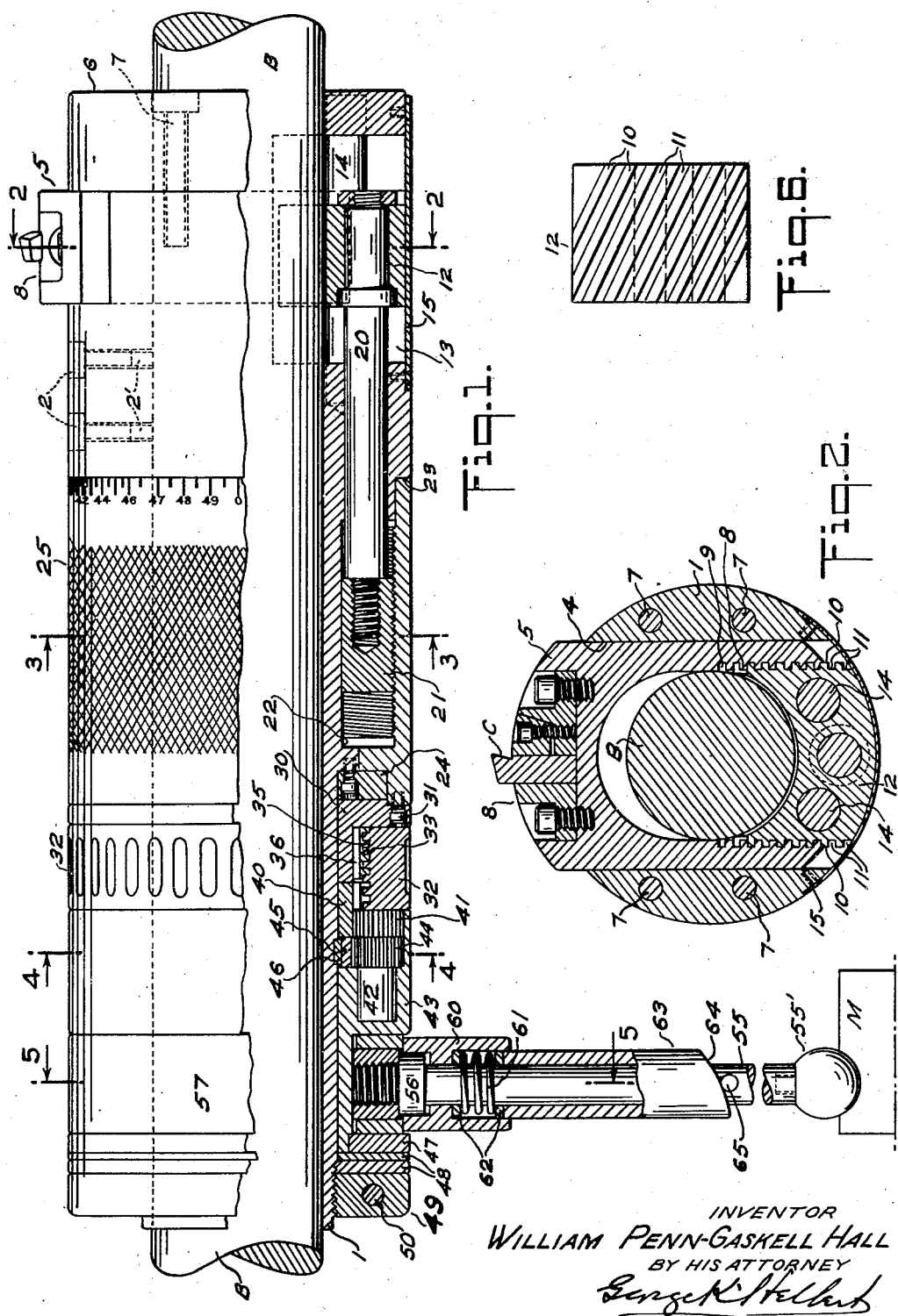
INVENTOR
WILLIAM PENN-GASKELL HALL
BY HIS ATTORNEY Dec. 21, 1948. W. PENN-GASKELL HALL 2,457,040
BORING HEAD
Filed Jan. 10, 1945 3 Sheets-Sheet 2
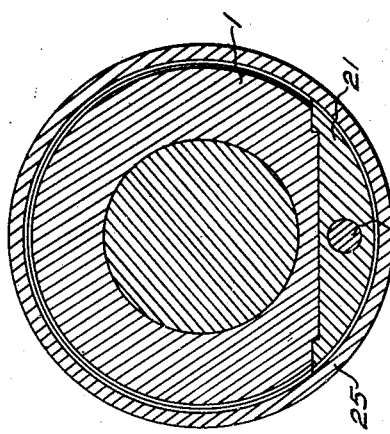
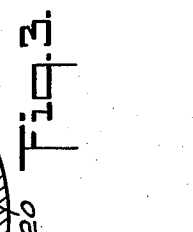
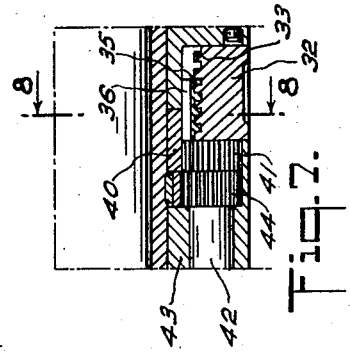
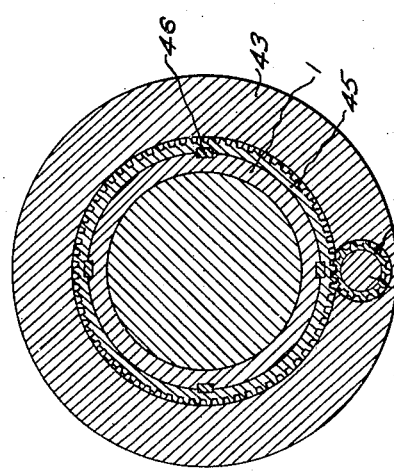
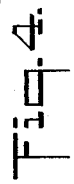
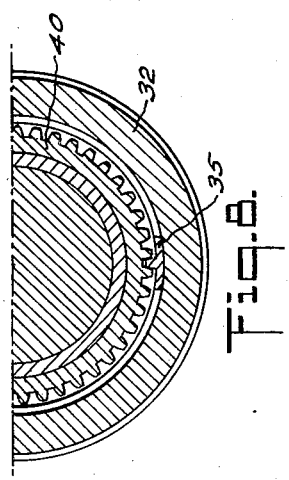
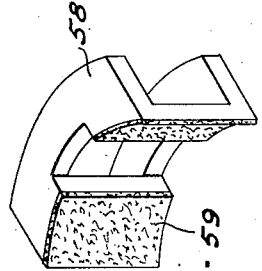
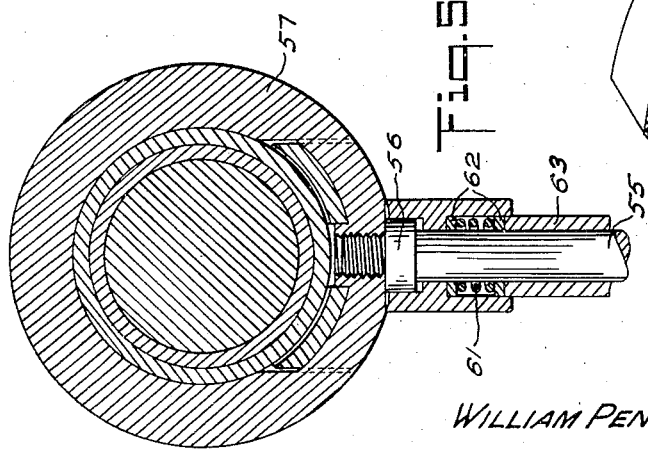
INVENTOR
WILLIAM PENN-GASKELL HALL
BY HIS ATTORNEY Dec. 21, 1948. W. PENN-GASKELL HALL 2,457,040
BORING HEAD
Filed Jan. 10, 1945 3 Sheets-Sheet 3
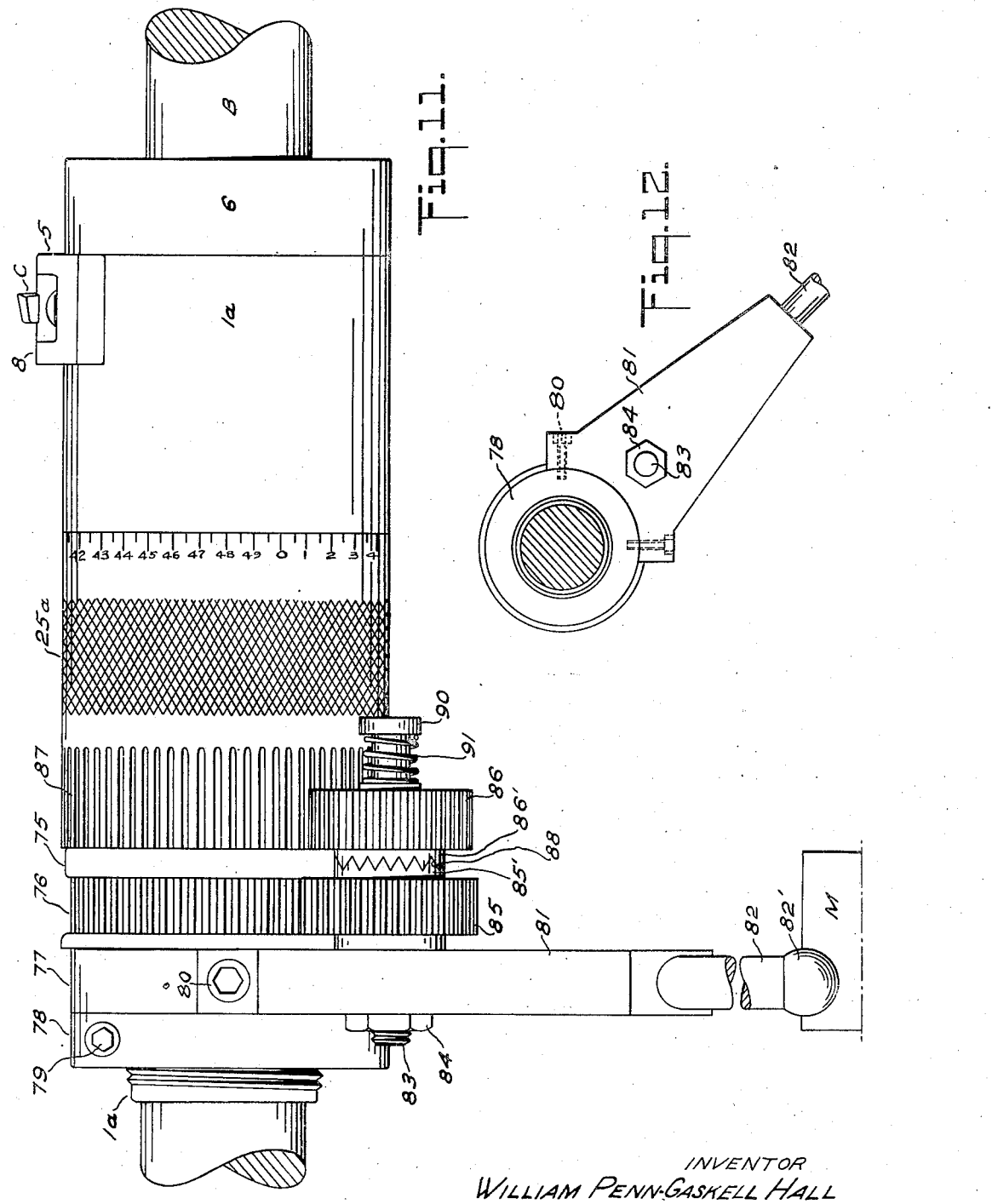
INVENTOR
WILLIAM PENN-GASKELL HALL
BY HIS ATTORNEY Patented Dec. 21, 1948

2,457,040

UNITED STATES PATENT OFFICE 2,457,040

BORING HEAD

William Penn-Gaskell Hall, Berwyn, Pa.

Application January 10, 1945, Serial No. 572,121

9 Claims. (Cl. 77—57)

As my invention is of particular utility in connection with horizontal boring mills although equally adapted for use with boring mills of other types, I shall describe it more especially with reference to such a mill, which, in general, comprises a horizontally extending rotatable, longitudinally movable bar from which the cutter extends radially and which is journaled in heavy pedestals rising from the base of the machine, together with a work holding support on which the work, for example a cylinder, is mounted between the pedestals with the bar extending substantially centrally through its bore, so that when the cutter is suitably adjusted and the rotating bar fed longitudinally a cut will be taken in the interior of the work, usually beginning at one end thereof and terminating at the other, to form a bore truly central with the axis of the bar.

My invention contemplates the provision of a head or attachment which is seated on the bar and through the medium of which the cutter may be adjusted radially with great facility, rapidity and accuracy in accordance with the diameter of bore to be formed in the work and, additionally, may be fed radially when desired whereby facing or other cuts in planes normal to the axis of the bar may be made. Thus with one setting-up of a work piece it may be bored and also end faced in the mill whereby absolute parallelism between its end faces and the axis of its bore may be attained and the necessity for resetting-up the piece for end facing after boring or vice versa entirely obviated while, in addition, the heavy cutting strains and the need for frequent resharpenings experienced with the conventional full face-width cutting tools now employed for facing cuts are eliminated as well as the difficulties inherent in sharpening and resetting the conventional facing tool to true parallelism.

The principal objects of the invention therefore are the provision of a boring head adapted for use in conjunction with a boring mill or the like which, among other things, facilitates setting the cutter for boring operations with maximum precision and in a minimum of time, which also permits the performance of facing and like operations with maximum precision and convenience through its ability to impart to a cutter progressive movement in a plane normal to the axis of the boring bar, and which may readily be conditioned for taking such cuts.

Other objects, advantages and novel features of design, construction and arrangement comprehended by the invention are hereinafter more particularly pointed out or will be apparent to those skilled in the art from the following description of certain embodiments thereof as illustrated in the accompanying drawings in which:

Fig. 1 is a view of the head in operative association with a boring mill the upper part of the head being shown in elevation and the lower part in longitudinal radial section;

Figs. 2, 3, 4 and 5 are respectively transverse sections on lines 2—2, 3—3, 4—4 and 5—5 in Fig. 1, some parts in Fig. 5, however, being shown in elevation;

Fig. 6 is a side view of the cam driving block removed from the assembly and slightly enlarged;

Fig. 7 is a fragmentary detail view in longitudinal section showing certain of the parts in a different position from Fig. 1;

Fig. 8 is a fragmentary section on line 8—8 in Fig. 7; and

Fig. 9 is a perspective view of the brake shoe removed from the assembly.

Fig. 10 is a perspective detail of the clutch key removed from the assembly;

Fig. 11 is a side elevation of a modified form of the invention; and

Fig. 12 is a fragmentary rear end elevation thereof on a smaller scale.

Like symbols of reference are used in the several figures to designate the same parts, and the directions in which the various sections are taken are indicated by the arrows on the section lines.

More particularly that form of the head shown in Figs. 1-9 inclusive comprises a hollow cylindrical body 1 adapted to snugly seat about a boring bar B to which it is operatively secured by two or more radially extending set screws 2 bearing against brass plugs 2' in turn bearing on the bar, thus preventing scoring of the latter. At one end, for convenience termed the front end, the body is provided with a transversely extending slot 4 for reception of a U-shaped slide 5 which is held in the slot by a cap 6 removably secured to the end of the body by longitudinally extending screws 7. The closed end of the slide is countersunk or otherwise suitably arranged for reception of a cutter holder generally designated as 8 which may be of any convenient construction adapted to hold a cutter C rigidly in proper position in the slide. Since the holder may be of any specific type adapted for its intended function detailed description of it would be superfluous although a holder of the form shown in Fig. 2 may be satisfactorily employed, and it will of course be understood that different forms of cutters C are used for boring and for facing, that shown being designed for the former purpose.

Slide 5 embraces bar B and is capable of being moved radially with respect thereto and for effecting this motion the legs of the slide are provided with camming means, desirably angularly disposed lands 8 and grooves 9 square in cross section, cooperating with camming means, such as similar lands 10 and grooves 11, on the sides of a cam block 12 (Fig. 6) which is interposed between the legs of the slide, its upper face being curved out to substantially conform to the curvature of the bar. This cam block is longitudinally slidable in a groove or chamber 13 extending in body 1 and cap 6 and is supported on two spaced rods 14 the ends of which seat in the bar and cap respectively, these rods being of relatively large diameter so as to adequately sustain the thrust imposed on them by the block and being preferably hardened and ground. To exclude chips and other foreign matter from groove 13 it is covered by a removable shield 15.

It will thus be apparent that when the cam block is moved longitudinally on rods 14 a radial movement will be imparted to the slide through the coacting sets of lands and grooves provided the angular disposition of the latter is not excessive. Consequently, while any angle greater than zero and less than that at which no motion can be induced in the slide may be selected, I prefer for a reason which will hereafter appear to locate the lands and grooves at an angle of 26° 33 minutes 54 seconds to the axis of bar B, the tangent of this angle being .500.

For imparting longitudinal movement to the cam block thereby to induce the radial movement in the slide, the front end of a drive bar 20 is secured, conveniently as shown, to the block, extended therefrom rearwardly and slidably through a bore in body 1 and connected at its rear end to an adjusting segment 21. This segment slidably bottoms in a recess 22 formed in the body and is surrounded by an adjusting sleeve 25 rotatably seating at its front end in a peripheral groove 23 in the body and abutting at its rear end against a ring 24 bolted to a flange on the latter whereby the sleeve is capable of rotation but not of longitudinal movement with respect to the body. The sleeve is internally threaded and segment 21 correspondingly externally threaded for cooperation therewith, with the result that by rotating the sleeve longitudinal movement can be imparted to the segment and in turn through drive bar 20 to cam block 12 so as to move the slide in or out radially in correspondence to the direction of rotation of the sleeve. With a view to facilitating rapid and accurate adjustment I prefer to make the pitch of the threads on the sleeve and segment 10 per inch with the result that when the grooves and lands on the cam block and slide are disposed at the preferred angle one turn of adjusting sleeve 25 imparts a radial feed of .050" to the slide. Desirably the adjusting sleeve is graduated circumferentially with 50 graduations each thus indicating .001" radial movement of the slide so that by turning the sleeve manually through any desired number of graduations cutter C can be moved in or out for a known distance whereby its radial setting can be accomplished very accurately and rapidly to dispose it for cutting a bore of given diameter in the work.

It will further be apparent that if the work and the bar B are restrained from relative longitudinal movement and a cutter C of proper form be disposed in the cutter holder, a facing cut can be taken on the end of the work by moving the slide and cutter radially, and reference will now be made to the means for mechanically effecting this movement when desired.

Therefore what is in essence a system of planetary gearing and clutch means for connecting it to sleeve 25 is provided together with a releasable brake for operatively restraining rotation of the "spider" in which certain of the gearing is mounted, so that by throwing in the clutch adjusting sleeve 25 may be caused to turn at a predetermined rate in respect to the revolution of bar B with resultant longitudinal movement of segment 21 to effect radial movement of the slide and cutter.

More particularly a ring 30 having a rearwardly extending flange is secured to the rear end of sleeve 25 as by bolts 31, this ring serving among other functions that of a thrust collar, and about its flanged portion and extending rearwardly thereof is disposed a rotatable clutch collar 32 provided with internal, preferably square threads 33 the collar being considerably wider than the length of the flange. Within this collar and normally overlying the flange is a key 35 having external threads cooperating with those in the collar and on its inner periphery a longitudinally extending dog 36 which in transverse section desirably approximates a gear tooth in shape. Clutch collar 32 has no connection with any part save key 35 and may therefore be rotated manually to move the latter rearwardly from the position of Fig. 1 to that of Fig. 7 or vice versa when desired.

Abutting the rear end of the flange on ring 30 is a driven ring gear 40 provided with external teeth in constant mesh with those of a pinion 41 integral with or operatively secured to a stud 42 rotatably seating in the generally hollow cylindrical planet spider 43 mounted and normally rotatable on body 1. Rearwardly of pinion 41, stud 42 carries another pinion 44 either integral with or operatively fixed to it so that the stud and both pinions always turn as a unit, this pinion 44 meshing with an externally toothed ring gear 45 operatively secured to body 1 as by keys 46; thus both pinions rotate when the body and bar B are revolving if spider 43 is restrained from rotation. While but one stud and pinion are shown in Fig. 1, a plurality thereof are normally utilized, as indicated in Fig. 4, to more equally distribute the drive about the tool.

Rearwardly of stud 42 spider 43 is reduced in diameter for reception of the brake mechanism later described and adjacent its outer end carries a spacer ring 47 against which abut a pair of thrust rings 48 the rearmost of which may desirably of neoprene or some other suitable material while a split collar 49 is threaded onto the rear end of the body to hold the parts in proper longitudinally adjusted relation after it has been screwed inwardly for the proper distance and constricted by a transversely extending clamp screw 50. The neoprene washer is then effective to exert sufficient friction on the parts to cause spider 43 to rotate with the body save when the brake is engaged.

The function of the latter is to releasably hold spider 43 against rotation with body 1 when it is desired to feed cutter C radially, and while it may be of any construction suitable for this purpose in its preferred embodiment it comprises a brake bar 55 conveniently terminating at its outer extremity in a knob 55' adapted to be rested against or engaged with any convenient fixed part M of the mill to thereby hold bar 55 against rotative movement in one direction. The bar projects in a generally radial direction from the body of the head and near its end proximate thereto is provided with an integral collar 56 beyond which it is externally threaded for reception in a correspondingly threaded bore in brake ring 57 which surrounds the reduced rear end of spider 43. This brake ring in proximity to the bar is cut out to receive a movable shoe 58 (best shown in Fig. 9) having curved inner faces conforming to the adjacent part of the spider provided with facings 59 of suitable friction material adapted to grip the spider when the shoe is forced against it through operation of a collar 60 through which bar 55 extends and which bears at its inner end against the outer surface of the shoe. This collar is slidable relatively to bar 55 and may be biased toward the shoe by a spring 61 seating in a counterbore at the outer end of the collar between thrust washers 62, the outermost of which abuts the proximate end of a brake-set sleeve 63 surrounding brake bar 55 and having a camming surface 64 at its opposite end cooperative with a pin 65 projecting from the bar, the sleeve being desirably exteriorly knurled to afford a satisfactory grip. Thus by cooperation of the cam surface and pin when the sleeve is turned in the proper direction, spring 61 may be compressed from the position shown in Fig. 1 so as to force collar 60 against shoe 58 to thereby press friction material 59 against the spider with sufficient force to prevent it from turning with body 1 when bar 55 is blocked against machine base M; thereafter by turning the sleeve in the opposite direction the pressure on the spider can be released whenever desired to allow it to resume its normal rotation with the body.

It will be observed that when not in use bar 55 with its attached parts may be readily unscrewed from ring 57 and stored in a convenient place. Moreover when bar 55 is removed and screws 2—2 loosened, the head can readily be moved along bar B through the bore in the work or through a series of such bores without removing it from that bar.

When the head is being used for boring operations the bar is ordinarily removed as just suggested and the clutch collar is turned so as to bring key 35 to the position shown in Fig. 1, that is, adjacent ring 30; then after a cutter C suitable for boring is placed in the tool holder it may be adjusted radially when and as required by manual rotation of adjusting sleeve 25.

When, however, the head is to be used for a facing or like operation, a suitable facing cutter is inserted in the holder and brake bar 55 screwed into ring 57. Clutch collar 32 is then turned manually in a direction to move key 35 rearwardly and thus enter its dog 36 between the teeth of drive gear 40, thereby locking the latter to ring 30 and so to adjusting sleeve 25. Bar B of the mill is then set in motion and either before or after this is done brake-set sleeve 63 is rotated so as to apply the brake to restrain spider 43 from rotation with body 1. It results under these conditions that gear 45, which is keyed thereto, drives pinions 44, 41 to turn driven gear 40 relatively to the body because of the difference of the number of teeth in the two pinions, and as gear 40 is operatively locked through key 35 and dog 36 to ring 30 a similar relative rotative movement is imparted to adjusting sleeve 25 which thus gradually moves segment 21, bar 20 and block 12 longitudinally and consequently slide 5 and cutting tool C radially to enable the latter to perform the facing cut. Ultimately, of course, the permissible longitudinal movement of block 12 will be reached and if the rotation of bar B were not arrested prior thereto serious damage to the head might occur if the braking mechanism whenever it is engaged were effective to positively hold spider 43 against turning. But since it is effective to hold the spider only up to the point at which the friction that it exerts thereon is exceeded, when block 12 reaches the end of its travel or in case of an excessive overload being thrown on the cutter at any time such as by an extremely hard spot in the metal, the brake will slip and permit the spider to turn, thus terminating further longitudinal movement of block 12 and radial movement of the slide and so relieving the parts from excessive strain.

In the preferred construction the ratio of the gear train through which the revolution of adjusting sleeve 25 is induced when facing cuts or the like are being taken is 10:1 and the threads on the sleeve 10 to the inch whereby ten revolutions of boring bar B produce one revolution of adjusting sleeve 25, thus advancing segment 21 .100″ and feeding the slide 5 radially .050″ which is equivalent to a feed of .005″ per revolution of the bar, but of course the head may be constructed to feed the slide and cutter radially for a greater or lesser distance during each of its revolutions.

Mention has heretofore been made of the way in which the position of the cutter and slide are normally adjusted when taking boring cuts, that is, by manual revolution of adjusting sleeve 25, but in case an extremely fine adjustment is desired it can be readily obtained by turning the clutch collar so as to engage key 35 with ring gear 40 whereby to bring the planetary transmission into play, and then manually turning spider 43 while the brake is in off position; under these conditions each revolution of the spider will move the cutter and slide radially .005″ when the head is constructed in accordance with the preferred practice, thus affording in effect a vernier or micrometer adjustment.

When the head is employed in making facing cuts or the like there is, of course, a heavy thrust on the cutter but by reason of the very high reduction preferably employed between it and the final "anchoring" force exerted by bar 55 against the base of the machine M only a comparatively light thrust is resolved against the latter, and deflections of boring bar B occasioned by the reaction of unbalanced forces thereon are negligible.

A boring head constructed in accordance with my invention is capable of forming a bore of any diameter between one whose radius is slightly greater than the radius of the head itself and one whose radius is determined by the maximum extent which the cutter and slide can be moved radially outward, and, preferably, the head is designed to cut a minimum bore slightly more than twice the diameter of the boring bar B being used; thus with a 3″ bar the smallest bore which can be formed is slightly greater than 6″ while the maximum would approximate 8″ to 10″ in diameter. Moreover if the bore in the body of the head is of greater internal diameter than the bar of the mill which is to be employed, a bushing can be readily inserted in the body to adapt it thereto.

In Figs. 11 and 12 is shown a boring head of modified construction which, because of its simplicity, low cost of manufacture and small number of parts, may sometimes be preferred to the head hitherto described as it is equally effective to perform the various operations of which the latter is capable. In this head the design and arrangement of the body, slide, cam block and its actuating means including the adjusting sleeve are, in general, similar to the corresponding parts hitherto illustrated and described so that further reference thereto is unnecessary so long as it is borne in mind that rotation of the adjusting sleeve is effective through these various parts and associated mechanisms to cause radial movement of the slide.

Somewhat different means, however, are provided for rotating the sleeve relatively to the body and boring bar B when it is desired to feed the slide mechanically, and reference will now be made to one embodiment thereof as shown in said figures. Thus proximate the rear end of sleeve 25a a collar 75 is fixed to the body 1a in any convenient way so as to inhibit longitudinal movement of the sleeve relatively to the body and, rearwardly of this collar, a driving gear 76 surrounds the body and is keyed thereto so as to rotate therewith. Behind this gear is disposed a bearing ring 77 which is freely rotatable on the body and a split collar 78 threaded onto the rear end of the latter is effective to hold the parts in proper longitudinally adjusted relation after it has been screwed inwardly for a suitable distance and constricted by the transversely extending clamp screw 79.

Preferably removably secured to the bearing ring as by bolts 80 is a generally triangular shaped bracket plate 81 from the apex of which extends a bar 82 corresponding to brake bar 55 and, like the latter, desirably provided with a head 82' adapted to be rested against base M or other convenient fixed portion of the mill to thereby prevent rotation of the bar in one direction.

This bar supports a stud 83 which is preferably threaded through it and locked in place by one or more nuts 84, the stud extending parallel to the axis of the body of the head. Adjacent the bracket a pinion 85 is rotatably mounted on the stud in meshing engagement with gear 76 and, remote from the bracket, another pinion 86 is also rotatably mounted on the stud to mesh with gear teeth 87 formed in the peripheral surface of sleeve 25a proximate its rear end, the pinions being respectively provided with oppositely directed cylindrical offsets 85', 86' having ratchet teeth 88 on their extremities adapted to mesh with each other. The outer end of the stud is enlarged to form a head 90 and between it and pinion 86 is disposed a coil spring 91 which constantly biases that pinion toward pinion 85 and maintains the ratchet teeth on the offsets in engagement so that the pinions normally rotate as a unit.

The ratio of the train consisting of driving gear 76, pinions 85, 86 and gear 87 on sleeve 25a is such that when in operation the sleeve revolves more slowly than the boring bar B, and is preferably so determined that the sleeve makes 9 revolutions for each 10 revolutions of the boring bar, that is, one complete revolution relatively to the bar to each 10 revolutions of the latter, and so through the cam block 12 and associated mechanisms effects a predetermined radial progression of the tool slide as long as the latter is capable of moving, but of course the particular ratio employed is a matter of choice.

On attainment of the limit of this movement, however, or should the tool encounter an extremely hard spot in the metal sufficient to impose an excessive load on the mechanism, the ratchet teeth between the pinions instead of maintaining their normal interfitting engagement under the bias of spring 91 ride over each other against the compression of the spring and so relieve the pinion and sleeve from the positive drive which would be imparted if the two pinions were rigidly connected whereby damage to the various parts which might otherwise occur is definitely prevented.

It will be obvious that when the head is to be used solely for forming cylindrical bores in the work or for other operations not requiring a radial feed of the tool, the bracket 81 carrying the stud, pinions and bar 82 can be readily removed and temporarily laid aside, thus leaving sleeve 25a in condition for manual rotation to effect radial adjustment of the tool to conform with the diameter of the desired bore in the work.

It will now be apparent that my invention provides not only a boring head which, when associated with a boring bar, enables adjustment of the cutter for boring cuts with maximum convenience and accuracy but also permits the taking of facing and like cuts when desired through its ability to impart a radial feed to the cutter in a plane normal to the axis of the boring bar.

It will further be apparent that through the medium of the boring head of my invention it is possible to form a taper bore in the work by feeding the cutter longitudinally and radially at the same time, the degree of taper being determined by the ratio between the movements of the cutter in the two directions. This ratio is of course controlled by the number of turns made by and longitudinal feed of boring bar B for each turn of the adjusting sleeve so that by changing the ratio of the gear train or other means by which the sleeve is driven bores of different taper can be formed.

Moreover while I have herein described and illustrated with considerable particularity certain embodiments of the invention I do not thereby desire or intend to restrict or confine myself thereto as numerous changes may be made in the design, construction and arrangement of the instrumentalities employed and in their method of assembly without departing from the spirit and scope of the invention as defined in the appended claims.

Having thus described my invention, I claim and desire to protect by Letters Patent of the United States:

1. A self-contained boring head adapted to be slid longitudinally over the end of and along a boring bar to a predetermined position thereon and comprising a hollow generally cylindrical body affording an uninterrupted passage for receiving the bar, means operable to removably secure the body to the bar in said position, a slide movable radially of the body having spaced legs extending on opposite sides of the bar when the head is seated thereon, cutter holding means adjacent one end of the slide, camming means on the inner faces of the legs of the slide, a cam block housed in the body and slidable longitudinally thereof having camming means cooperative with those on the slide, an internally threaded sleeve rotatably mounted on the body, an element having threads cooperative with those on the sleeve arranged for longitudinal movement in the body, and means connecting said element with the block whereby rotation of the sleeve is operative to move the element and block longitudinally and through the interaction of the respective camming means on the block and slide to move the latter radially of the body.

2. A self-contained boring head adapted to be slid longitudinally over the end of and along a boring bar to a predetermined position thereon and comprising a hollow generally cylindrical body affording an uninterrupted passage for receiving the bar, means operable to removably secure the body to the bar in said position, a U-shaped slide extending transversely of and into the body with its legs on opposite sides of the bar when the head is seated thereon, cutter holding means adjacent the closed end of the slide, inclined lands and grooves on said legs, a block slidable axially of the body having lands and grooves cooperating with those on the slide, an internally threaded sleeve rotatable about the body, a correspondingly threaded element cooperative therewith for longitudinal movement in the body upon rotation of the sleeve, and means connecting said element and said block whereby rotation of the sleeve is operative through the coaction of the respective sets of lands and grooves to move the slide radially of the body.

3. A boring head of the class described comprising a hollow cylindrical body adapted to surround and for securement upon a boring bar, a slide movable radially of the body adjacent one end thereof, cutter holding means, and camming means carried by the slide, a block slidable longitudinally of the body having camming means cooperative with those on the slide, a sleeve rotatable about the body, means cooperative with the sleeve for translating the block on rotation of the sleeve to thereby move the slide through coaction of said camming means, and means for automatically rotating the sleeve relatively to the body when the bar is rotating to thereby move the slide comprising a gear fixed to the body, a spider normally rotatable on the body, coaxial pinions of different diameter carried by and together rotatable relatively to the spider, one of said pinions being driven by said gear, a second gear normally rotatable about the body and meshing with the other pinion, disengageable clutch means connecting the last mentioned gear with the sleeve, and brake mechanism operable to releasably hold the spider against rotation with the body whereby to cause the first mentioned gear to drive one of said pinions at a rate determined by the rate of revolution of the body and boring bar and the other pinion and hence the last mentioned gear and the sleeve at a different rate with respect thereto.

4. A boring head of the class described comprising a hollow cylindrical body adapted to surround and for securement upon a boring bar, a slide movable radially of the body adjacent one end thereof, cutter holding means and camming means carried by the slide, a block slidable longitudinally of the body having camming means cooperative with those on the slide, a sleeve rotatable about the body, means cooperative with the sleeve for translating the block on rotation of the sleeve to thereby move the slide through coaction of said camming means, and means for automatically rotating the sleeve relatively to the body when the bar is rotating to thereby progressively move the slide comprising a spider normally rotatable on the body, a pair of coaxial pinions carried by and rotatable as a unit relatively to the spider, one of said pinions having a fewer number of teeth than the other, a gear fixed to the body meshing with one of said pinions, a gear rotatable relatively to the body meshing with the other pinion, clutch means disengageably connecting said gear with the sleeve, and brake mechanism operable to releasably hold the spider against rotation with the body whereby when the clutch means are engaged the last mentioned gear is driven by the pinion meshing therewith at a different rate from that at which the body is being turned thereby to cause the sleeve to rotate with respect to the body.

5. A boring head of the class described comprising a hollow cylindrical body adapted to surround and for securement upon a boring bar, a slide movable radially of the body adjacent one end thereof, cutter holding means and camming means carried by the slide, a block slidable longitudinally of the body having camming means cooperative with those on the slide, a sleeve rotatable about the body, means cooperative with the sleeve for translating the block on rotation of the sleeve to thereby move the slide through coaction of said camming means, and means for automatically rotating the sleeve relatively to the body when the bar is rotating to thereby progressively move the slide comprising a spider normally rotatable on the body, a pair of coaxial pinions carried by and rotatable as a unit relatively to the spider, one of said pinions having a fewer number of teeth than the other, a gear fixed to the body meshing with one of said pinions, a gear rotatable relatively to the body meshing with the other pinion, clutch means disengageably connecting said gear with the sleeve and comprising an internally threaded clutch collar rotatable about the body, an externally threaded key cooperative therewith for longitudinal movement upon rotation of the collar and carrying means engageable with the last mentioned gear when moved toward it, and brake mechanism operable to releasably hold the spider against rotation with the body whereby when the clutch means are engaged the last mentioned gear is driven by the pinion meshing therewith at a different rate from that at which the body is being turned thereby to cause the sleeve to rotate with respect to the body.

6. A boring tool of the class described comprising a hollow cylindrical body adapted to surround and for securement upon a boring bar, a slide movable radially of the body adjacent one end thereof, cutter holding means and camming means carried by the slide, a block slidable longitudinally of the body having camming means cooperative with those on the slide, a sleeve rotatable about the body, means cooperative with the sleeve for translating the block on rotation of the sleeve to thereby move the slide through coaction of said camming means, and means for automatically rotating the sleeve relatively to the body when the bar is rotating to thereby progressively move the slide comprising a spider normally rotatable on the body, a pair of coaxial pinions carried by and rotatable as a unit relatively to the spider, one of said pinions having a fewer number of teeth than the other, a gear fixed to the body meshing with one of said pinions, a gear rotatable relatively to the body meshing with the other pinion, clutch means disengageably connecting said gear with the sleeve, and brake mechanism operable to releasably hold the spider against rotation with the body whereby when the clutch means are engaged the last mentioned gear is driven by the pinion meshing therewith at a different rate from that at which the body is being turned thereby to cause the sleeve to rotate with respect to the body, said mechanism including a brake ring surrounding the body, a shoe movable in the brake ring adapted to be pressed against the spider, means for releasably biasing the shoe against the brake ring, and means for holding said biasing means against rotation with the body of the tool.

7. A boring head of the class described comprising a hollow cylindrical body adapted to surround and for securement upon a boring bar, a slide movable radially of the body adjacent one end thereof, cutter holding means and camming means carried by the slide, a block slidable longitudinally of the body having camming means cooperative with those on the slide, a sleeve rotatable about the body, means cooperative with the sleeve for translating the block on rotation of the sleeve to thereby move the slide, through coaction of said camming means, and means for automatically rotating the sleeve relatively to the body when the bar is rotating to thereby progressively move the slide comprising a spider normally rotatable on the body, a pair of coaxial pinions carried by and rotatable as a unit relatively to the spider, one of said pinions having a fewer number of teeth than the other, a gear fixed to the body meshing with one of said pinions, a gear rotatable relatively to the body meshing with the other pinion, clutch means disengageably connecting said gear with the sleeve, and brake mechanism operable to releasably hold the spider against rotation with the body whereby when the clutch means are engaged the last mentioned gear is driven by the pinion meshing therewith at a different rate from that at which the body is being turned thereby to cause the sleeve to rotate with respect to the body, said mechanism comprising a brake ring surrounding the spider, a shoe loosely seating in the ring having its inner faces conforming to the spider, means for forcing said shoe against the spider to restrain it from rotation with the body comprising a bar extending from the brake ring, a collar surrounding the bar and bearing on the brake ring, a sleeve on the bar, means for forcing the sleeve toward the shoe, and a spring interposed between the shoe and collar whereby through rotation of the sleeve the spring can be compressed to force the shoe toward the spider, the bar being adapted for anchorage against a fixed support to prevent its rotation in one direction.

8. A self-contained boring head adapted to be slid longitudinally over the end of and along a boring bar to a predetermined position thereon and comprising a hollow generally cylindrical body affording an uninterrupted passage for receiving the bar, means operable to removably secure the body to the bar in said position, a slide having limited radial movement with respect to the body adapted to support a cutter adjacent its outer end, a sleeve rotatable about the body, means interposed between the sleeve and the slide for moving the latter on rotation of the sleeve, and means normally operative to drive the sleeve from and relatively to the body when the latter is rotating with the bar, said means comprising a gear carried by the body, a gear on the sleeve, and a pair of pinions respectively meshing with said gears and normally rotatable as a unit.

9. A self-contained boring head adapted to be slid longitudinally over the end of and along a boring bar to a predetermined position thereon and comprising a hollow generally cylindrical body affording an uninterrupted passage for receiving the bar, means operable to removably secure the body to the bar in said position, a U-shaped slide having spaced legs embracing the bar when the head is seated thereon, the slide having limited radial movement with respect to the body and adapted to support a cutter adjacent its outer end, a sleeve rotatable about the body, means interposed between the sleeve and the slide for moving the latter on rotation of the sleeve, and means normally operative to drive the sleeve from and relatively to the body when the latter is rotating with the bar, to thereby move the slide, said means including gears respectively carried by the body and sleeve and a pair of pinions respectively meshing with said gears, and means normally maintaining driving connection between the pinions whereby to cause them to rotate as a unit but adapted to sever such connection when the slide reaches the limit of its radial travel or an excessive load is thrown on the cutter.

WILLIAM PENN-GASKELL HALL.

REFERENCES CITED

The following references are of record in the file of this patent:

UNITED STATES PATENTS

| Number | Name | Date |
|---|---|---|
| 455,640 | Rohland | July 7, 1891 |
| 502,446 | Nottingham et al. | Aug. 1, 1893 |
| 1,191,813 | Mummert et al. | July 18, 1916 |
| 1,496,059 | Lanzetta | June 3, 1924 |
| 1,962,951 | Conwell | June 12, 1934 |
| 2,117,327 | Ihm et al. | May 17, 1938 |
| 2,333,233 | Bold | Nov. 2, 1943 |
| 2,356,651 | Chandler | Aug. 22, 1944 |